United States Patent [19]

Colliver

[11] Patent Number: 4,973,231
[45] Date of Patent: Nov. 27, 1990

[54] SUBMERSIBLE PUMP

[75] Inventor: Anthony D. Colliver, Marino, Australia

[73] Assignee: F. F. Seeley Nominees Pty. Ltd., Australia

[21] Appl. No.: 411,415

[22] Filed: Sep. 22, 1989

[51] Int. Cl.⁵ .......................... F04B 35/04; F04B 39/06
[52] U.S. Cl. ...................................... 417/369; 417/420
[58] Field of Search ................... 417/369, 420, 423.15, 417/423.16, 424.1

[56] References Cited

U.S. PATENT DOCUMENTS 2,460,371  2/1949  Szwargulshi ........................ 417/369
4,013,384  3/1977  Oihawa ............................ 417/420 X
4,407,641  10/1983 Long ................................ 417/420 X Primary Examiner—John C. Fox
Attorney, Agent, or Firm—Brown, Martin, Haller & McClain

[57] ABSTRACT

A submersible pump comprises a motor housing, a pump beneath the housing having an impeller magnetically driven through a division wall by the motor, a heat dissipation wall forming a hollow which extends into the motor housing from the division wall, a hollow bleed post extending upwardly from the bottom of the pump into the hollow of the heat dissipation wall and providing a bleed discharge path from the pump and through the hollow of the wall, and back into the sump of the air conditioner.

5 Claims, 2 Drawing Sheets

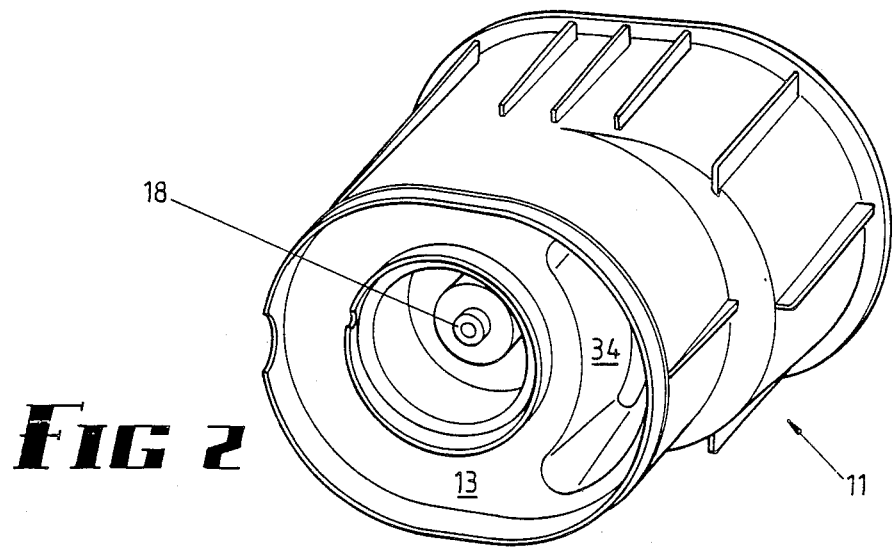
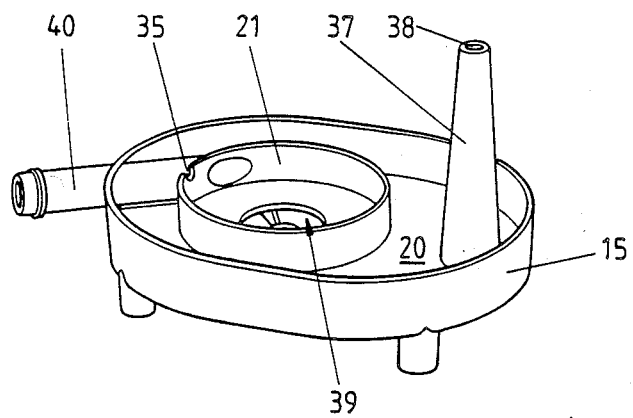

4,973,231

SUBMERSIBLE PUMP

This invention relates to a submersible pump and although not limited to a submersible pump usable in an evaporative cooler, the invention is applicable to such use.

BACKGROUND OF THE INVENTION

Submersible pumps are in common use, usually employing an electric motor contained within a housing and having a shaft incorporated through glands to an impeller. Pumps which are in continuous use such as suds pumps usually rely upon heat transfer from a cool liquid, through the walls of the motor housing, to cool the motor, but in applications such as evaporative coolers submersible pumps are seldom used, since transfer of heat from the motor is difficult to achieve because the motor is fully enclosed but not immersed, and a deleterious temperature rise can occur within the motor housing which can result in casing damage and motor burn out on hot days. It is an object of this invention to provide a pump wherein likelihood of such damage is greatly reduced.

BRIEF SUMMARY OF THE INVENTION

In this invention a submersible pump comprises a motor housing, a pump beneath the housing having an impeller magnetically driven through a division wall by the motor, a heat dissipation wall forming a hollow which extends into the motor housing from the division wall, a hollow bleed post extending upwardly from the bottom of the pump into the hollow of the heat dissipation wall and providing a bleed discharge path from the pump and through the hollow of the wall, and back into the sump of the air conditioner.

With this arrangement there is an area of cooled wall within the motor housing which tends to retain the temperature surrounding the motor within limits so that it is less likely for burn out to occur than with previously used submersible pumps.

More specifically, the invention consists of a motor housing, a cap closing an upper end of the motor housing, a division wall closing a lower end of the motor housing, a pump having a rotor and a stator, said stator engaging the lower end of the motor housing, a motor in the motor housing having a depending rotor shaft and a fan assembly on the rotor shaft, the fan assembly comprising fan blades and a magnetic driver, the pump rotor comprising a pump impeller and a magnetic driver member magnetically coupled to the magnetic driver through portion of the division wall, bearing means operatively located between the division wall and the pump rotor, a heat dissipation wall extending upwardly from the division wall into the motor housing from the pump defining a hollow in fluid flow communication with a downstream side of the pump impeller, and bleed means extending into the hollow from the pump providing a bleed discharge path from the pump and through the hollow.

BRIEF DESCRIPTION OF THE DRAWINGS

An embodiment of the invention is described hereunder in some detail with reference to and is illustrated in the accompanying drawings in which:

FIG. 2 is a perspective underside view of the motor housing, and

FIG. 3 is a perspective view of the pump base, FIGS. 2 and 3 constituting an "exploded" view.

DETAILED DESCRIPTION OF THE PREFERRED EMBODIMENT

Figure 1:
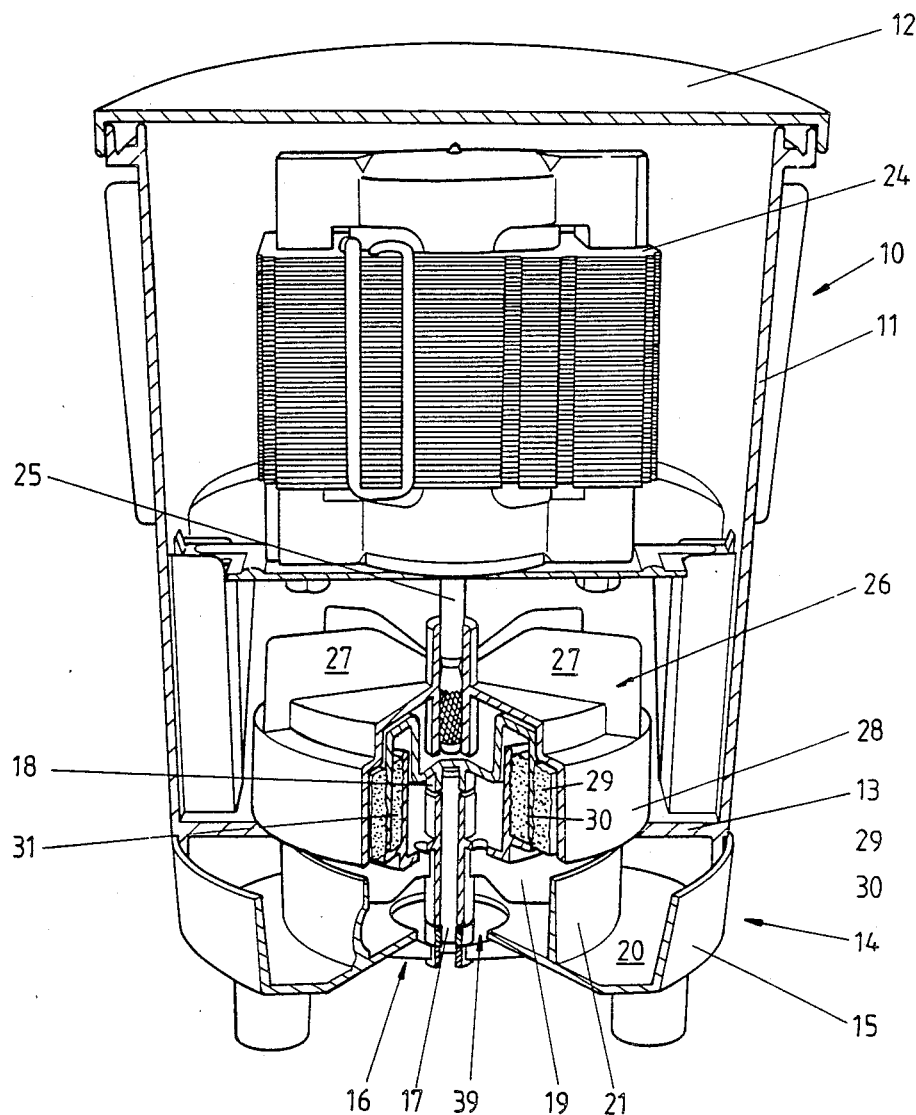
FIG. 1 is a sectioned perspective elevation of a submersible pump.

In the preferred embodiment illustrated herein a submersible pump 10 comprises a motor housing 11, a cap 12 closing the upper end of the motor housing 11, a division wall 13 closing the lower end of the motor housing, a pump 14 having a pump base 15 and containing a pump rotor 16 which has a boss journalled for rotation about the pin 17 which depends from a boss 18 in the division wall 13.

The pump rotor 16 has impeller blades 19 radiating therefrom, the impeller blades 19 being rotatable above the pump floor 20 and within an upstanding circular ring 21.

The motor housing 11 contains a motor 24 secured thereto, the motor 24 having a depending rotor shaft 25 and a fan assembly 26 thereon, the fan assembly 26 carrying on it fan blades 27 and also having a depending annular skirt 28 which itself contains a magnetic driver, being an annular ring of ferrite 29. This ring of ferrite 29 is adjacent to a vertically extending portion 30 of division wall 13, and within that vertically extending portion 30 the pump rotor carries a driven magnetic ring 31 which delivers torque from the rotor shaft 25 of motor 24 to the pump rotor 16.

As explained above, there is some difficulty in dispersing heat generated by motor 24 and to reduce the problems caused by such heat, the division wall 13 has a heat dissipation wall 34 extending upwardly into the motor housing 11 (FIG. 2) and the ring 21 of the pump base 15 is provided with a water leakage notch 35 on the downstream side of the rotor impeller blades 19 such that water is caused to flow into the base 15 around ring 21 and upwardly into the hollow defined by heat dissipation wall 34.

An upstanding bleed post 37 contains a bleed aperture 38 which provides a bleed discharge path from pump 14, through the base 15 and back into the sump of a cooler. Thus there is a heat transfer gradient across the heat dissipation wall 34, the magnitude of which is influenced by the velocity of air flow imparted by fan blades 27 in the motor housing, and the coolant flow through the hollow defined by wall 34. The sump is not illustrated herein but in use the pump base 15 is immersed in the sump and the pump impeller blades 19 cause flow of water upwardly through the inlet opening 39 and outwardly through a delivery tail 40, for dispersion over a wetting surface.

In addition to the improved cooling facilities provided by the invention, it will be noted that all the moving parts are aligned by the post 18, with the division wall 13 fully separating the motor housing 11 from the pump 14, with the cap 12 shedding any splashed water, and that there is no gland through which leakage can take place back into the motor housing 11.

What is claimed is:

1. A submersible pump comprises a motor housing, a cap closing an upper end of the motor housing, a division wall closing a lower end of the motor housing, a pump having a rotor and a stator, said stator engaging the lower end of the motor housing, a motor in the motor housing having a depending rotor shaft and a fan assembly on the rotor shaft, the fan assembly comprising fan blades and a magnetic driver, the pump rotor comprising a pump impeller and a magnetic driven member magnetically coupled to the magnetic driver through portion of the division wall, bearing means operatively located between the division wall and the pump rotor, a heat dissipation wall extending upwardly from the division wall into the motor housing from the pump defining a hollow in fluid flow communication with a downstream side of the pump impeller, and bleed means extending into the hollow from the pump providing a bleed discharge path from the pump and through the hollow.

2. A submersible pump according to claim 1 wherein the magnetic driver and driven member both comprise ferrite rings on each side of said division wall portion, which is a vertically extending portion.

3. A submersible pump according to claim 1 wherein the pump rotor bearing means comprise a pin depending centrally from the division wall, the pump rotor comprising a boss journalled for rotation about the pin.

4. A submersible pump according to claim 1 wherein the bleed means comprises an upstanding post having a bleed aperture therein which opens into the hollow defined by the heat dissipation wall.

5. A submersible pump according to claim 4 wherein the pump comprises a base having a pump floor, a ring upstanding from the floor and surrounding an inlet opening, a water leakage path through the ring, the impeller being rotatable within the ring so that water is pumped through the water leakage path into hollows defined by the heat dissipation wall, and a hollow post upstanding from the floor and providing said bleed discharge path.

* * * * *